United States Patent [19]

Amberg et al.

[11] Patent Number: 4,610,484
[45] Date of Patent: Sep. 9, 1986

[54] DECELERATION CONTROL BRAKE SYSTEM

[75] Inventors: Robert L. Amberg, Seattle; Jerome C. Rosenberg, Bellevue, both of Wash.

[73] Assignee: The Boeing Company, Seattle, Wash.

[21] Appl. No.: 535,389

[22] Filed: Sep. 23, 1983

[51] Int. Cl.$^4$ .............................................. B60T 8/02
[52] U.S. Cl. ..................................... 303/100; 364/426
[58] Field of Search ................. 303/93, 100, 101, 104; 364/426

[56] References Cited

U.S. PATENT DOCUMENTS

| | | | |
|---|---|---|---|
| Re. 30,763 | 10/1981 | Hirzel et al. | 364/426 |
| 2,764,263 | 9/1956 | Bricker | 188/152 |
| 2,944,772 | 7/1960 | Armstrong et al. | 244/111 |
| 2,992,860 | 7/1961 | Hirzel . | |
| 3,237,996 | 3/1966 | Lucien | 303/105 |
| 3,520,575 | 7/1970 | Steigerwald | 303/93 |
| 3,674,318 | 7/1972 | Hickner et al. | 303/100 |
| 3,711,163 | 1/1973 | Booher | 303/93 |
| 3,776,605 | 12/1973 | Ruof | 303/100 |
| 3,829,167 | 8/1974 | Ruof et al. | 303/93 |
| 3,847,445 | 11/1974 | Bissell et al. | 303/92 |
| 3,881,783 | 5/1975 | Shiber | 303/116 |
| 3,917,356 | 11/1975 | DeVleig | 303/93 |
| 3,920,204 | 11/1975 | Bissell et al. | 244/111 |
| 3,920,278 | 11/1975 | Hirzel et al. | 303/93 |
| 3,948,569 | 4/1976 | Gentet et al. | 303/100 |
| 4,022,513 | 5/1977 | Hirzel et al. | 303/93 |
| 4,043,607 | 8/1977 | Signorelli et al. | 303/100 |
| 4,138,164 | 2/1979 | Masclet | 303/105 |

*Primary Examiner*—Duane A. Reger
*Attorney, Agent, or Firm*—Bruce A. Kaser

[57] ABSTRACT

A brake control system particularly suited for use on aircraft having hydraulically applied carbon disc brakes.

Braking is controlled by displacing a foot pedal. A first transducer, connected to the pedal, measures the magnitude of displacement and produces a first electrical signal. A second transducer, connected to wheel means, measures the speed of the wheel means during braking and produces a second electrical signal. The first and second electrical signals are transmitted to control circuit means which compares them. If the second signal indicates that wheel means deceleration is not substantially proportional to foot pedal displacement, the control circuit means sends a control signal to electrically operate a pressure control valve which meters hydraulic fluid pressure to operate the brakes such that wheel means deceleration is substantially directly proportional to foot pedal displacement.

15 Claims, 7 Drawing Figures

DECELERATION CONTROL BRAKE SYSTEM

TECHNICAL FIELD

This invention relates to landing wheel braking systems for aircraft. More specifically, it relates to a foot pedal controlled braking system adapted to provide a braking rate for each wheel truck which is at all times proportional to foot pedal displacement.

BACKGROUND ART

The aircraft braking system of the present invention applies to all types of hydraulically applied brakes but is particularly suited for use on aircraft having hydraulically applied carbon disc brakes.

Because of their light weight, carbon disc brakes are currently being used on aircraft. A common well-known problem with carbon disc brakes is that they apply a torque reaction to an aircraft wheel which is non-linear with speed. For example, the torque reaction typically increases at low speeds even though the hydraulic pressure which actuates the brakes remains constant. As a result, in order to smoothly brake an aircraft, a pilot must constantly adjust brake hydraulic pressure, usually by a pressure control valve mechanically connected to a foot pedal by a cable.

The patent literature discloses a number of braking system patents which propose solutions to the foregoing problem. Hirzel et al, U.S. Pat. No. Re 30,763; Masclet, U.S. Pat. No. 4,138,164; Signorelli et al, U.S. Pat. No. 4,043,607; Hirzel et al, U.S. Pat. No. 4,022,513, Gentet et al, U.S. Pat. No. 3,948,569; Hirzel et al, U.S. Pat. No. 3,920,278; Booher, U.S. Pat. No. 3,711,163; and Steigerwald, U.S. Pat. No. 3,520,575 all disclose a way of regulating hydraulic pressure to compensate for a non-linear braking action. Most pertinent is Hirzel, U.S. Pat. No. 3,920,278 which discloses an automatic braking control system that enables a pilot to preselect a constant rate of deceleration, with the system adjusting hyraulic pressure to compensate for non-linear braking action. The Hirzel system includes a control dial by which one of a plurality (e.g. 5) of deceleration rates can be selected. The system maintains a constant aircraft deceleration according to that rate which is selected. The system operates automatically, independent of pilot control, until the pilot manually actuates the brake pedals which switches off automatic control.

A disadvantage to the above automatic braking system is that it provides no means for separately controlling individual wheel trucks on the landing gear of the aircraft. The landing gear on large aircraft typically includes two wheel trucks each of which is located laterally opposite the other. Each wheel truck is separately controlled by a brake pedal and therefore can be braked separately. By braking one truck at a greater or lesser rate than the other, a pilot can use the brakes as a means for steering the aircraft when landing. The above system automatically brakes each truck at the same constant deceleration rate. Thus, if the pilot wishes to use the brakes for steering control he cannot use the automatic braking system. As a consequence, the pilot must then contend with the above mentioned non-linear braking action. If the pilot chooses not to use the brakes for steering purposes, leaving braking to the automatic system, then all steering must be done by operation of the rudder which is not as effective a means for steering, especially at low speeds.

Many aircraft do not have automatic braking systems. All braking is done by the pedals and the non-linear brake response is always a problem.

Another disadvantage to the above described automatic braking system is that the pilot cannot change the rate of deceleration when under automatic control. The pilot preselects a rate of deceleration and the system continues to brake the aircraft at that rate until the pilot depresses one or both brake pedals, thereby switching to manual control.

A further disadvantage to the above system is that it does not have the capability to provide a pilot with "feel" control of the brakes such that the pilot is assured of having a smooth, linear braking response which is at all times proportional to the displacement of a pilot-operated brake pedal.

As will become apparent upon further reading of this disclosure, the present invention solves the above-discussed disadvantages.

The following patents disclose other braking systems related or similar to those described above but not as pertinent to the present invention:

| | |
|---|---|
| Amberg et al | U.S. Pat. No. 4,078,845 |
| Bissell et al | U.S. Pat. No. 3,920,204 |
| DeVlieg | U.S. Pat. No. 3,917,356 |
| Shiber | U.S. Pat. No. 3,881,783 |
| Bissell et al | U.S. Pat. No. 3,847,445 |
| Rouf et al | U.S. Pat. No. 3,829,167 |
| Lucien | U.S. Pat. No. 3,237,996 |
| Hirzel | U.S. Pat. No. 2,992,860 |
| Armstrong et al | U.S. Pat. No. 2,944,772 |
| Bricker | U.S. Pat. No. 2,764,263 |

DISCLOSURE OF THE INVENTION

In basic form, the present invention comprises hydraulically controlled brake means. The brake means is located on wheel means and is operated by a pressurized hydraulic fluid. A conduit provides a means for delivering the hydraulic fluid to the brake means, and an electrically operated pressure control valve is located in the conduit for regulating fluid pressure during braking. Braking is controlled by displacing a foot pedal. Pedal displacement is detected by a first transducer, connected to the pedal, which produces a first electrical signal indicating the magnitude of the pedal displacement. A second transducer, connected to the wheel means, produces a second electrical signal which is a deceleration wheel speed signal that indicates wheel means speed during braking. These first and second electrical signals are transmitted to control circuit means which compares them. If the second electrical signal indicates that wheel means deceleration is not substantially proportional to foot pedal displacement, the control circuit means sends a control signal to electrically operate the pressure control valve. The control circuit means operates the pressure control valve to regulate the hydraulic pressure in the conduit means such that the brake means produces wheel means deceleration which is substantially directly proportional to the displacement of the foot pedal.

The control circuit means includes differentiation circuit means, error circuit means, and summation circuit means. The differentiation circuit means is connected to the second transducer and receives the wheel means speed signal from it. The wheel means speed signal is a velocity signal and must be differentiated into a deceleration signal. The differentiation circuit means transforms this signal into a deceleration signal which is then transmitted to the error circuit means. The error circuit means is connected to both the first transducer and the differentiation circuit means. It compares the deceleration signal produced by the differentiation circuit means with the first electrical signal from the first transducer. If the deceleration signal is not substantially the same as the first signal, thereby indicating that the braking rate, or wheel means deceleration, is not substantially proportional to foot pedal displacement, then the error circuit means generates an error signal which is transmitted to the summation circuit means.

The summation circuit means is connected to both the first transducer and the error circuit means. It receives any error signal generated by the error circuit means and adds the error signal to the first electrical signal from the first transducer. This added or summed signal is then sent by the control circuit means to the electrical operator for the pressure control valve, to regulate hydraulic fluid pressure during braking so that the wheel means decelerates proportionately according to foot pedal displacement.

In one embodiment of the invention, the control circuit means includes antiskid circuit means which also receives the second electrical signal from the second transducer connected to the wheel means. If the second signal indicates thay the wheel means is skidding, the antiskid circuit means responds by sending a control signal to the electrical operator for the pressure control valve, and regulates the hydraulic fluid pressure to counter wheel means skidding. As an alternative, in another embodiment of the invention, an electrically operated antiskid valve is positioned in the conduit means between the pressure control valve and the brake means. Antiskid circuit means, separate from the control circuit means, receives the signal from the second transducer. If the signal indicates that the wheel means is skidding, the antiskid circuit means responds by producing and sending a control signal to the antiskid valve which overrides the pressure control valve and regulates hydraulic fluid pressure to counter wheel means skidding.

Another aspect of the invention is that it can be readily adapted to pre-existing braking systems having a pedal operated pressure control valve and an electrically operated antiskid valve positioned in conduit means between the pedal operated valve and hydraulically operated brake means.

Typically, the pedal operated valve is connected to the foot pedal by a cable. The first transducer is connected to the foot pedal and sends a first signal that indicates pedal displacement. The control circuit means is connected to the antiskid system such that it can control the antiskid valve.

During braking operation, the pedal operated valve controls fluid pressure to the brakes. However, the control circuit means constantly monitors the signal from the second transducer which is connected to the wheel means. If an error signal is generated, thus indicating that wheel means deceleration is not proportional to foot pedal displacement, then the control circuit means sends a control signal to the electrically operated antiskid valve, overriding the pedal operated valve, to adjust hydraulic fluid pressure so that actual wheel means deceleration is directly proportional to foot pedal displacement.

In another embodiment of the invention, there may be more than one wheel means, each of which is connected to a separate second transducer. The control circuit means responds to signals from each second transducer by having averaging circuit means. The averaging circuit means receives the signal from each second transducer, averages them, and then generates another signal indicative of an average wheel means speed for all the wheel means. The control circuit means then responds to this signal and controls the pressure control valve such that hydraulic fluid pressure is regulated to cause the brake means on each wheel means to produce an average deceleration for all the wheel means that is substantially directly proportional to foot pedal displacement.

In one embodiment of the invention, the first transducer is a linear voltage displacement transducer which produces an output voltage signal proportional to foot pedal displacement. In another embodiment of the invention, the first transducer is a force transducer which produced an output voltage signal proportional to the force applied to the foot pedal by the foot of a pilot or other operator.

In another embodiment of the invention, wheel means speed can be provided by signal generating means other than a transducer connected to the wheel means. For example, an aircraft inertial reference system could provide a signal indicating aircraft speed to the control circuit means. The signal from the inertial reference system would be compared with foot pedal displacement in a similar manner as the comparison made with the second transducer.

The principle object of the present invention is to provide a manual braking system in which the pilot maintains "feel" control over the brakes.

An advantage to the present invention is that it provides a braking system which produces a deceleration rate that is substantially directly proportional to brake pedal displacement at all times. The invention provides the pilot with a smooth, linear aircraft deceleration for any particular foot pedal position. Furthermore, braking response remains smooth as the position of the pedal is changed. The pilot can change the displacement of the pedal at any time during landing, and be assured that he will "feel" a corresponding smooth and linear response from the brakes.

Another advantage to the present invention is that it enables a pilot to differentially brake separate wheel trucks. Such differential braking provides the pilot with a means for steering the aircraft during landing.

These and other aspects and advantages of the invention will be more readily apparent when the description of the invention is read in conjunction with the drawings. It is not intended that the scope of the invention shall be limited in any way other than those limitations which are set forth in the appended claims.

BEST MODE FOR CARRYING OUT THE INVENTION

Figure 1:
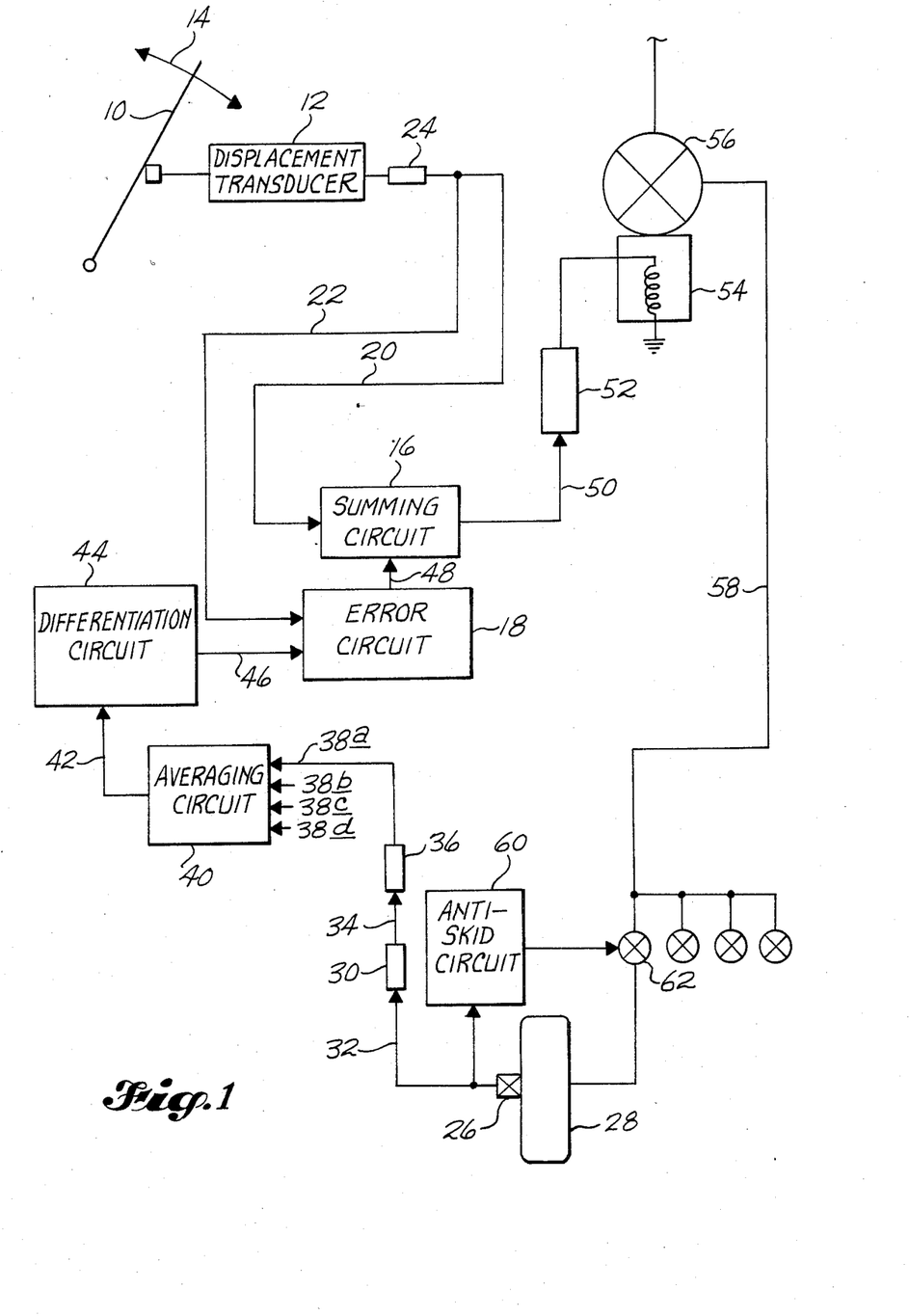
FIG. 1 is a functional block diagram of the brake control system embodying a preferred form of the invention.
Figure 2:
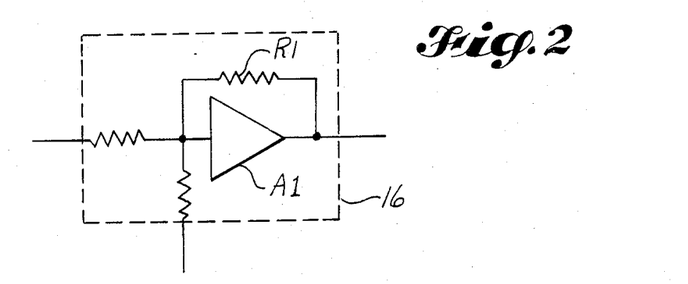
FIG. 2 is a schematic showing of an operational amplifier circuit which is part of the brake control system presented in FIG. 1.
Figure 3:
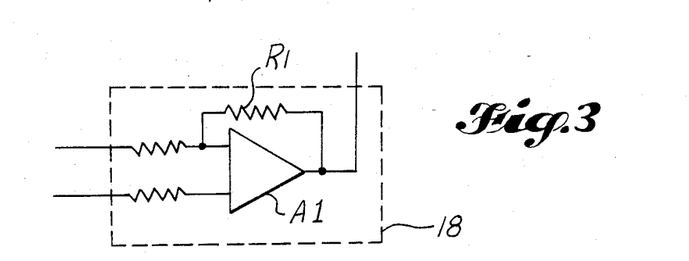
FIG. 3 is a schematic showing like FIG. 2 of an operational amplifier circuit which is part of the brake control system presented in FIG. 1.
Figure 4:
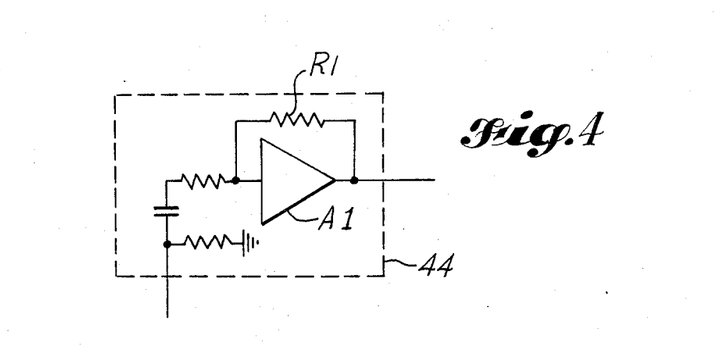
FIG. 4 is a schematic showing like FIG. 3 of an operational amplifier circuit which is part of the brake control system presented in FIG. 1.
Figure 5:
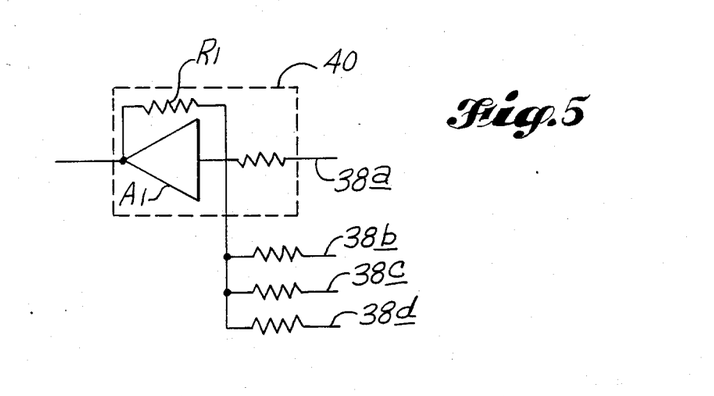
FIG. 5 is a schematic showing like FIG. 4 of an operation amplifier circuit which is part of the brake control system presented in FIG. 1.

Referring now to the drawings, shown in FIG. 1 is a displaceable brake pedal 10 connected to a displacement transducer 12. The displacement transducer 12 measures the displacement of the brake pedal 10 as it moves back and forth in the direction of arrow 14. Transducer 12 produces and sends a first electrical signal, commanding a desired deceleration rate, to both a summing circuit 16 and an error circuit 18 as is indicated by lines 20 and 22, respectively. In a preferred embodiment of the invention, the displacement transducer 12 is a linear voltage displacement transducer which develops an alternating current (AC) output voltage signal that is proportional to the displacement of foot pedal 10. However, a potentiometer which produces an output voltage signal proportional to the force that is applied to the foot pedal could be used as well.

As was just mentioned, the first electrical signal produced by the displacement transducer 12 is an AC voltage signal. The summing circuit 16 and the error circuit 18 are primarily amplifier circuits. They are operable solely in response to direct current (DC) voltage signals. Therefore, a demodulator circuit 24 is interposed between the displacement transducer 12 and both the summing circuit 16 and the error circuit 18. The demodulator circuit 24 takes the AC voltage signal from the displacement transducer 12 and converts it into a DC voltage signal that is proportional to the displacement of foot pedal 10.

A second transducer 26 is connected to a wheel 28 and provides a second electrical signal that indicates the speed of wheel 28 during landing of the aircraft. This transducer 26 is mounted to the axle of the wheel 28 and is driven by the wheel hub. It provides an AC voltage signal with a frequency proportional to the speed of wheel 28. The signal from transducer 26 is transmitted to a filter and square circuit 30, as is indicated by line 32. The filter and square circuit 30 converts the signal into a square wave voltage signal. This signal is then transmitted through line 34 to a converter circuit 36 which converts the square wave signal into a DC voltage signal that is indicative of the speed of wheel 28. Then, this converted signal travels through line 38 to an averaging circuit 40.

The landing gear of large aircraft typically includes two wheel trucks, displaced laterally opposite from each other, which have four wheels on each truck. In a preferred embodiment of the invention, each wheel on a wheel truck has a second transducer, such as transducer 26, connected to it. The signal from each wheel is filtered and converted into a DC voltage signal in the same manner as described above. Then the signal is sent to the averaging circuit 40. The signal input from each wheel is indicated by arrows 38a–38d in FIG. 1. The averaging circuit 40 receives each signal and averages them to provide a composite signal representing an average wheel speed for all the wheels on a particular wheel truck. After the averaging circuit 40 averages the signals from the wheels, the averaged signal is sent (line 42) to a differentiation circuit 44. At this point, the signal represents an average velocity for all the wheels on the truck. The differentiation circuit 44 differentiates this velocity signal into another signal which is indicative of wheel deceleration. Once the wheel speed signal has been differentiated, it is sent to error circuit 18, as indicated by line 46, which compares this wheel deceleration signal with the signal from displacement transducer 12.

It should be noted at this point that the invention is adaptable for use on a plurality of wheels, or it could be used for a solitary wheel if so desired. Averaging circuit 40 would not be required if it is desired to use the signal from one wheel only.

If the signal from wheel transducer 26 does not agree with the signal from displacement transducer 12, the error circuit develops a DC error voltage signal. This error signal is sent to the summing circuit 14, as indicated by line 48. The summing circuit 16 adds the error voltage signal to the signal from displacement transducer 12 and sends this added or summed signal through line 50 to a valve driver 52. The valve driver 52 is a circuit which converts the signal from summing circuit 16 into a control current which controls an electrical operator 54 of a pressure control valve 56.

Wheel 28 has brakes which are hydraulically applied by a hydraulic fluid that is delivered to the brakes by a conduit 58. Changing the hydraulic fluid pressure in the conduit 58 also changes the force applied by the brakes to wheel 28. The valve driver 54 drives the pressure control valve 56 in accordance with the signal which the valve driver 52 receives from summing circuit 16, to either open or close the pressure valve 56. This in turn increases or decreases hydraulic fluid pressure in conduit 58 which thereby adjusts the brakes on wheel 28 such that the braking rate or deceleration of the wheel is substantially proportional to the displacement of foot pedal 10.

At all times during braking, summing circuit 16 and error circuit 18 are receiving signals from the displacement transducer 12 and wheel speed transducer 26 (after demodulating, averaging, differentiating, etc.). The error circuit 18 constantly compares the two signals, and if there is a difference between them, the error circuit 18 generates an error signal which is received by the summing circuit 14. As was described earlier, the summing circuit 16 adds the error signal to the signal from displacement transducer 12 and sends the added signal to the valve driver 52 which operates the pressure control valve 56 to readjust hydraulic fluid pressure changing the braking action until the signal from transducer 26 matches the signal from displacement transducer 12.

As is also shown in FIG. 1, the invention can be combined with an antiskid system which provides protection against wheel skidding. An antiskid circuit 60 also receives the signal from wheel transducer 26. An antiskid valve 62 is located in the conduit 58 between the wheel 28 and the pressure control valve 56. Being located in this position permits the antiskid valve 62 to overide the pressure control valve 56. The antiskid circuit 60 receives the signal from wheel transducer 26, and if the signal indicates that the wheel 28 is skidding, then the antiskid circuit operates antiskid valve 62 to reduce pressure in conduit 58 such that the brakes will be released and the wheel will no longer skid. FIG. 1 also shows three other antiskid valves, each of which is connected to a separate wheel on the same wheel truck, and which are separately controlled by antiskid circuitry.

To summarize the operation of the invention, the brake pedal 10, displacement transducer 12, wheel transducer 26, and the combination of the above-discussed circuitry and pressure control valve 56 operate as a closed-loop control system. The brake pedal commands a deceleration, which can be changed at any time in the braking process. The closed-loop system constantly monitors the wheel speed by means of transducer 26, and by controlling pressure control valve 56, meters the hydraulic fluid pressure in conduit 58 such that the deceleration of wheel 28 matches the command of foot pedal 10. If the deceleration rate of wheel 28 deviates from that rate which is selected by pedal 10, the pressure in conduit 58 is either decreased, or increased to eliminate the deviation. Throughout the braking process, the speed of wheel 28 is constantly monitored by the control-loop and compared to the command or displacement of foot pedal 10. In this way, the pilot is assured of having total "feel" control of the aircraft brakes at all times during braking.

The summing circuit 16, error circuit 18, differentiation circuit 44, averaging circuit 40, and antiskid circuit 60 are standard well-known circuitry. Schematic diagrams of the summing circuit 16, error circuit 18, differentiation circuit 44, and averaging circuit 40 are shown in FIGS. 2-5, respectively. Basically, these circuits are analog circuits. More specifically, they are operational amplifier circuits connected in a summing mode. A resistor R1 is connected in parallel to an operational amplifier A1 in each circuit to provide a scaled voltage signal. It is also possible to use digital circuitry in place of analog circuitry.

Figure 6:
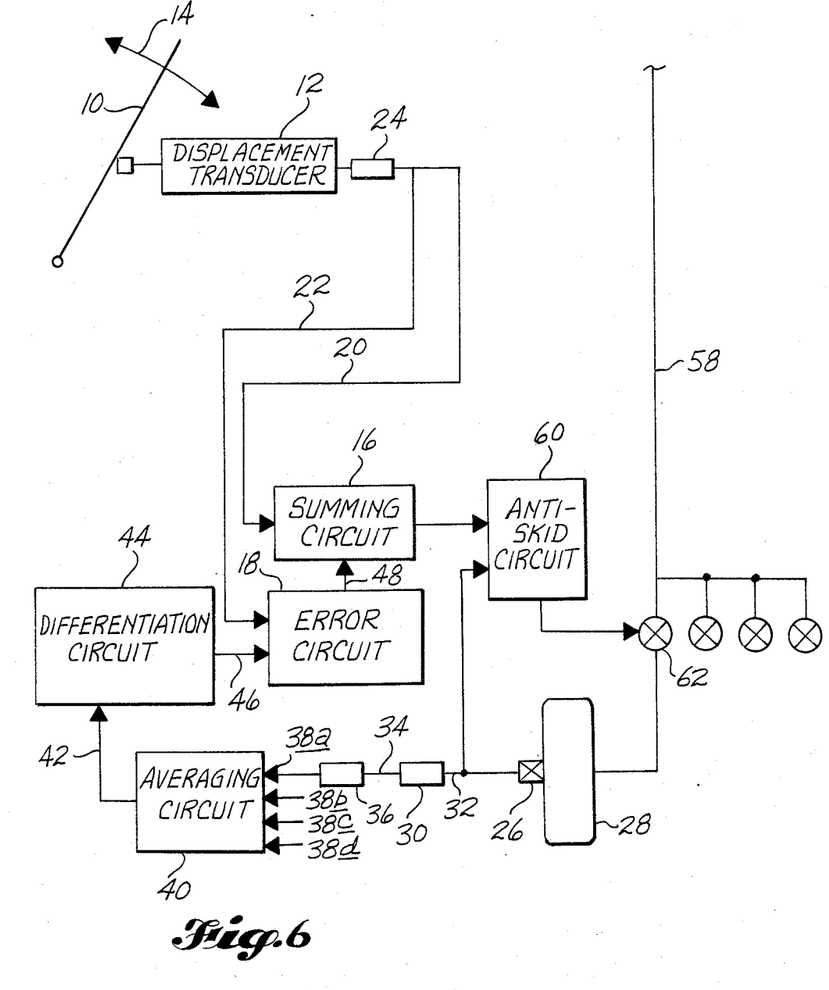
FIG. 6 is a functional block diagram of the brake control system embodying another form of the invention.

In another embodiment of the invention, shown in FIG. 6, the closed-loop system of FIG. 1 combined with antiskid circuit 60 to provide all brake control functions through antiskid valve 62. In this embodiment, the antiskid valve 62 is used to both adjust hydraulic fluid pressure for the brakes on wheel 28, and to provide antiskid protection. The antiskid circuit receives the signal from the summing circuit 16 and adjusts the fluid pressure by operating valve 62. The antiskid circuit also receives the signal from wheel transducer 26 and adjusts valve 62 if it becomes necessary to prevent skidding.

Figure 7:
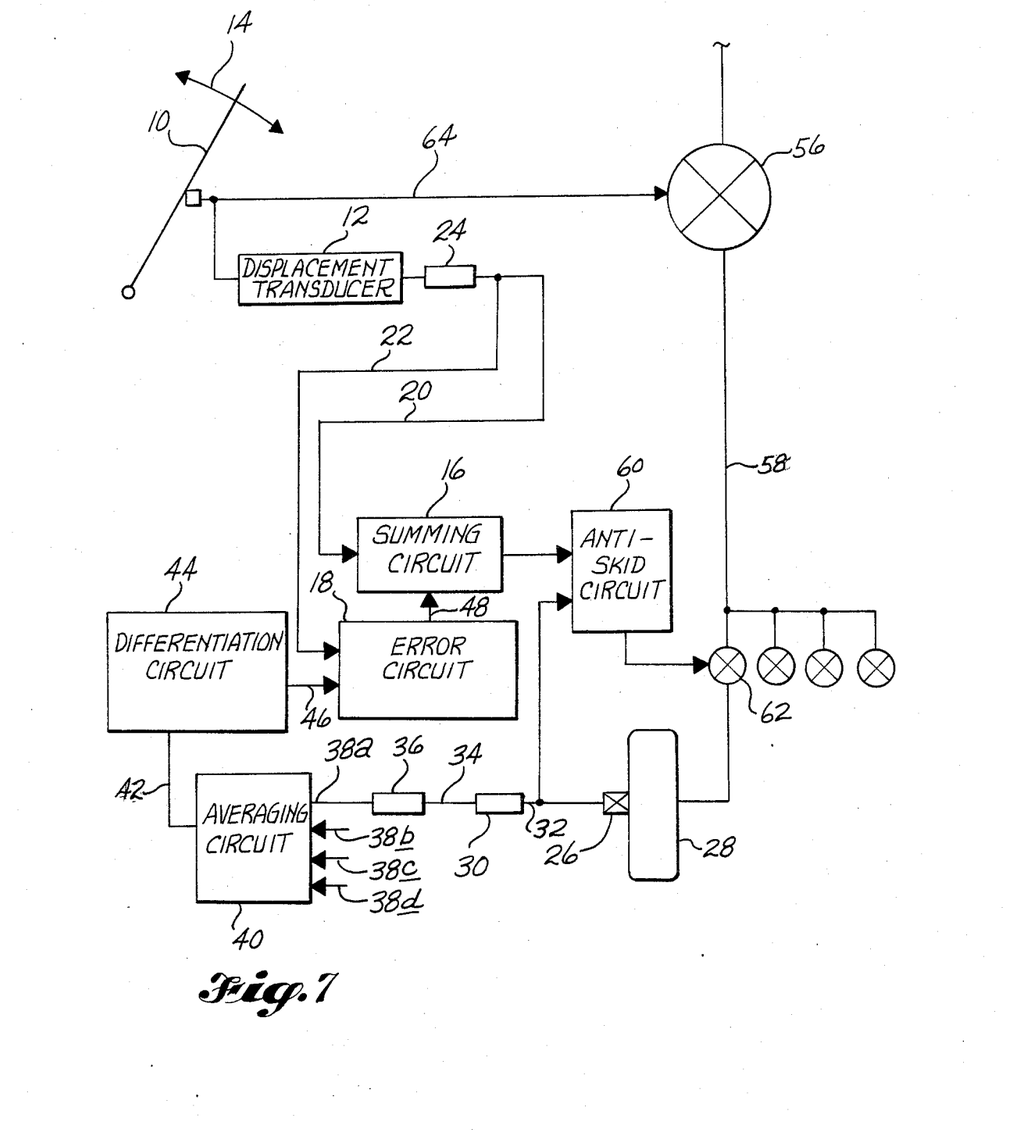
FIG. 7 is a functional block diagram of the brake control system embodying a further form of the invention.

In another embodiment of the invention, shown in FIG. 7, the brake control system can be connected to a preexisting system wherein pressure control valve 56 is connected by a cable 64 to foot pedal 10, with valve 56 being directly operated by the foot pedal. The displacement transducer 12 detects displacement of foot pedal 10 and sends a signal to both the error circuit 18 and the summing circuit 16. The error circuit 18 also receives a wheel speed signal from wheel transducer 26 in exactly the same manner as has been previously described. The error circuit 18 compares the signals from the displacement transducer 12 with the signal from the wheel transducer 26 and generates an error signal if the deceleration rate of wheel 28 is not substantially the same as that which is commanded by foot pedal 10. If this is the case, the summing circuit 16 receives the error signal from error circuit 18, adds the error signal to the signal received from displacement transducer 12, and sends this added signal to the antiskid circuit 60. The antiskid circuit 60 operates antiskid valve 62 in response to the signal received from summing circuit 48, by operating antiskid valve 62, to override the pedal-operated pressure control valve 56 until the speed of wheel 28 is substantially proportional to the displacement of foot pedal 10.

The invention and its attendant advantages should be understood from the foregoing description, and it is apparent that various changes may be made in the form of the invention without departing from the spirit and scope thereof. The invention has been described herein merely by way of example. The invention is not to be restricted to any specific form or use, except as to those restrictions set forth in the accompanying claims.

What is claimed is:

1. A braking system, comprising:
   wheel means;
   hydraulic brake means on said wheel means;
   conduit means for delivering a hydraulic operating fluid to the hydraulic brake means;
   a pressure control valve in the conduit means for regulating the pressure of the hydraulic operation fluid delivered to the brake means for adjusting and controlling deceleration of the wheel means, the valve including an electrical operator which adjusts the valve;
   a foot pedal;
   a first transducer connected to the foot pedal for producing a first electrical signal indicative of pedal displacement, the tranducer being connected to the electrical operator in a manner so that the first signal is transmitted to the electrical operator for controlling deceleration of the wheel means in response to foot pedal displacement;
   a second transducer connected to the wheel means for produced a second electrical signal indicative of wheel means deceleration during braking; and
   control circuit means including summing circuit means and error circuit means, said error circuit means being operatively connected to said first and second transducers for receiving both the first signal indicating foot pedal displacement and the second signal indicating wheel means deceleration, wherein the error circuit means compares both of such signals to determine if wheel means deceleration is substantially directly proportional in response to foot pedal displacement, and wherein the error circuit means generates an error signal if the wheel means deceleration is not substantially proportional to foot pedal displacement, and further, said summing circuit means being operatively connected to said error circuit means so as to receive any generated error signal therefrom, and with said summing circuit means being operatively positioned between said first transducer and said electrical operator to receive the first signal, and to adjust the first signal by using the error signal if generated, and to transmit the adjusted signal to the electrical operator in a manner for operating the pressure control valve to regulate hydraulic fluid pressure to the brake means during braking to produce wheel means deceleration which is substantially directly proportional to foot pedal displacement.

2. The invention according to claim 1, wherein said control circuit means includes an antiskid circuit means responsive to said second electrical signal for producing and sending a control signal to the electrical operator for the pressure control valve, for operating the pressure control valve to regulate hydraulic fluid pressure to the brake means during braking to counter skidding.

3. The invention according to claim 1, including an antiskid valve in the conduit means positioned between the pressure control valve and the brake means, said antiskid valve having an electrical operator; and antiskid circuit means responsive to said second signal for producing and sending a control signal to the electrical operator of the antiskid valve to regulate hydraulic fluid pressure to the brake means to counter skidding.

4. A braking system, comprising:
wheel means;
hydraulic brake means on said wheel means;
conduit means for delivering a hydraulic operating fluid to the hydraulic brake means;
a pressure control valve in the conduit means including an electrical operator;
a foot pedal;
a second pressure control valve in the conduit means which is operated by the foot pedal, said electrically operated pressure control valve being positioned in the conduit means between said pedal operated valve and said brake means;
a first transducer connected to the foot pedal for producing a first electrical signal indicative of pedal displacement;
a second transducer connected to the wheel means for producing a second electrical signal indicative of wheel means deceleration during braking; and
control means responsive to said first and second electrical signals for producing and sending a control signal to said electrically operated valve if the operation of said pedal operated valve results in the wheel means deceleration not being substantially directly proportional to foot pedal displacement, said control means causing said electrically operated valve to override said pedal operated valve, to adjust the pressure of the hydraulic fluid delivered to said brake means so that wheel means deceleration will be substantially proportional to foot pedal displacement.

5. The invention according to claim 4, wherein said control means includes antiskid circuit means responsive to said second signal for producing and sending a control signal to the electrically operated pressure control valve to regulate hydraulic fluid pressure to the brake means to counter skidding.

6. The invention according to claim 1, wherein said second transducer produces an electrical signal indicating wheel means speed, and including differentiation circuit means responsive to said speed signal which transforms the same into a deceleration signal.

7. The invention according to claim 4, wherein said control circuit means includes error circuit means, connected to both said first transducer and said second transducer, for comparing said wheel means deceleration signal with said first electrical signal, and for generating an error signal only if said deceleration signal indicates that the braking rate does not produce wheel means deceleration which is substantially directly proportional to foot pedal displacement.

8. The invention according to claim 7, wherein said control circuit means further includes summation circuit means, connected to both said first transducer and said error circuit means, for summing said generated error signal to said first electrical signal, said control circuit means utilizing such summation to operate the pressure control valve so that hydraulic fluid pressure is regulated during braking to produce wheel means deceleration which is substantially directly proportional to foot pedal displacement.

9. The invention according to claim 6, including a plurality of wheel means each of which is connected to a transducer for producing an electrical signal indicative of the deceleration of each respective wheel means during braking, and said control means includes averaging circuit means responsive to each of said wheel means deceleration transducers for generating a signal indicative of an average wheel means deceleration for all the wheel means, said control circuit means being responsive to said first signal and to said signal representing the average wheel means deceleration such that a control signal is sent to the electrically operated pressure control valve, for operating said valve to regulate hydraulic fluid pressure to the brake means during braking to produce an average deceleration for all the wheel means which is substantially directly proportional to foot pedal displacement.

10. The invention according to claim 1, wherein said first transducer is a linear voltage displacement transducer which produces an output voltage signal proportional to the displacement of said foot pedal.

11. The invention according to claim 1, wherein said first transducer is a force transducer which produces an output voltage signal proportional to the force applied to said foot pedal by the foot of an operator.

12. The invention according to claim 1, wherein said second transducer is connected to an axle of said wheel means, and is driven by said wheel means so as to provide an alternating current voltage with a frequency proportional to wheel speed.

13. The invention according to claim 8, wherein said second transducer produces an electrical signal indicating wheel means speed, and including differentiation circuit means responsive to said speed signal which transforms the same into a deceleration signal.

14. The invention according to claim 13, including a plurality of wheel means each of which is connected to a transducer for producing an electrical signal indicative of the deceleration of each respective wheel means during braking, and said control means includes averaging circuit means responsive to each of said wheel means deceleration transducers for generating a signal indicative of an average wheel means deceleration for all the wheel means, said control circuit means being responsive to said first signal and to said signal representing the average wheel means deceleration such that a control signal is sent to the electrically operated pressure control valve if the operation of said pedal operated valve results in the average wheel means deceleration not being substantially directly proportional to foot pedal displacement, for operating the electrically operated valve to regulate hydraulic fluid pressure to the brake means during braking, to produce an average deceleration for all the wheel means which is substantially directly proportional to foot pedal displacement.

15. The invention according to claim 13, wherein said control circuit means includes an anti-skid circuit means responsive to said second electrical signal for producing and sending a control signal to the electrically operated pressure control valve, for operating such valve to regulate hydraulic fluid pressure to the brake means during braking to counterskidding.

* * * * *

UNITED STATES PATENT AND TRADEMARK OFFICE
CERTIFICATE OF CORRECTION

PATENT NO. : 4,610,484

DATED : September 9, 1986

INVENTOR(S) : Robert L. Amberg et al.

It is certified that error appears in the above-identified patent and that said Letters Patent are hereby corrected as shown below:

Column 3, line 28, "thay" should be -- that --.

Column 4, line 21, "produced" should be -- produces --.

Column 5, lines 4 and 5, "operation" should be -- operational --.

Column 7, line 41, -- is -- should be inserted after "Fig. 1".

Claim 1, Column 8, line 24, "operation" should be -- operating --.

Claim 1, Column 8, line 38, "produced" should be -- producing --.

Signed and Sealed this

Sixth Day of January, 1987

Attest:

DONALD J. QUIGG

Attesting Officer      Commissioner of Patents and Trademarks